(No Model.) 2 Sheets—Sheet 2.

S. B. ALLISON.
WATER OR FLUID FILTER.

No. 513,551. Patented Jan. 30, 1894.

WITNESSES:
Henry Grabau
Ricardo

INVENTOR
Samuel B. Allison.
by W. S. Stringfellow
ATTORNEY

UNITED STATES PATENT OFFICE.

SAMUEL B. ALLISON, OF NEW ORLEANS, LOUISIANA.

WATER OR FLUID FILTER.

SPECIFICATION forming part of Letters Patent No. 513,551, dated January 30, 1894.

Application filed July 10, 1893. Serial No. 480,078. (No model.)

*To all whom it may concern:*

Be it known that I, SAMUEL BENJAMIN ALLISON, a citizen of the United States, residing at New Orleans, in the parish of Orleans and State of Louisiana, have invented certain new and useful Improvements in Water or Fluid Filters; and I do declare the following to be a full, clear, and exact description of the invention, such as will enable others skilled in the art to which it appertains to make and use the same.

My invention relates to an improvement in a water, fluid or oil filter, and its novelty will be fully understood from the following description and claim, when taken in connection with the annexed drawings.

The objects of my invention are to provide a filter that will produce a rapid filtration of water for any purpose desired, or for filtering oils, or saccharine solutions. I attain these objects by the mechanism illustrated in the accompanying drawings, in which—

Figure 1:
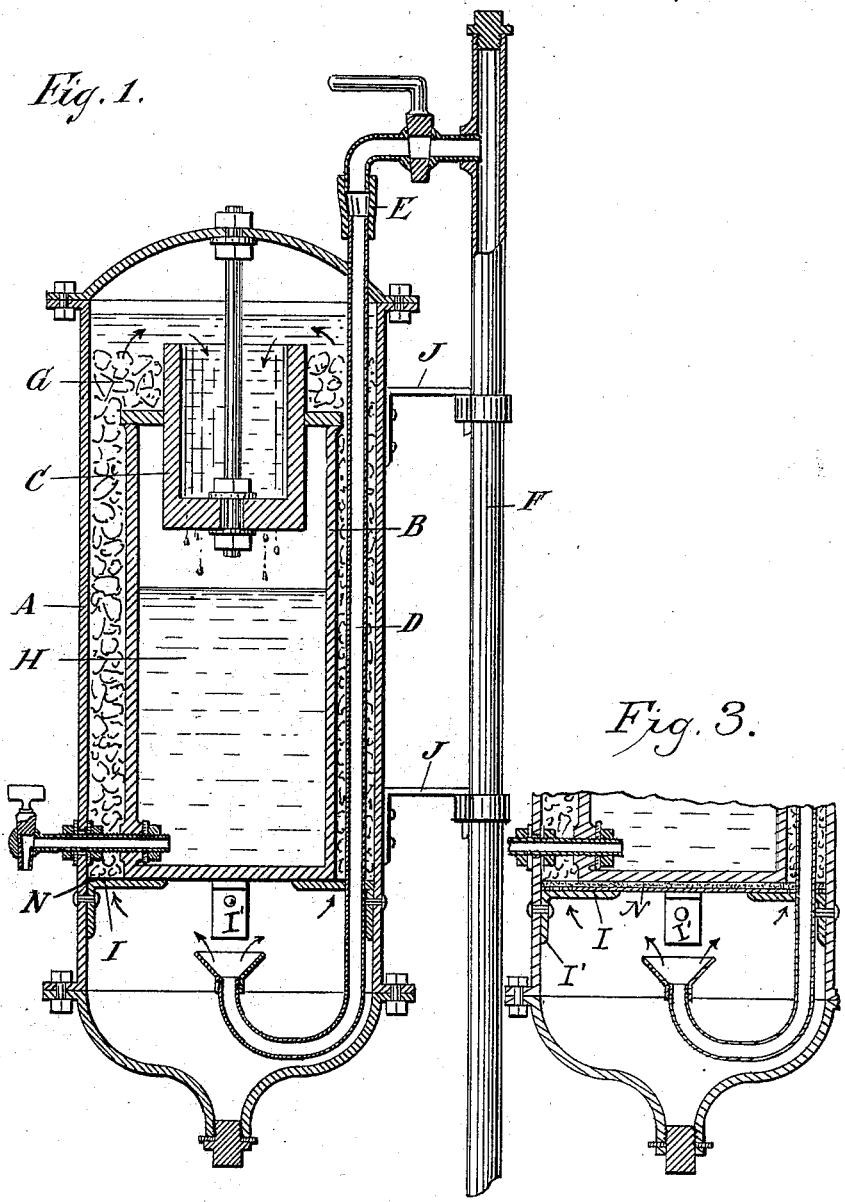
Figure 2:
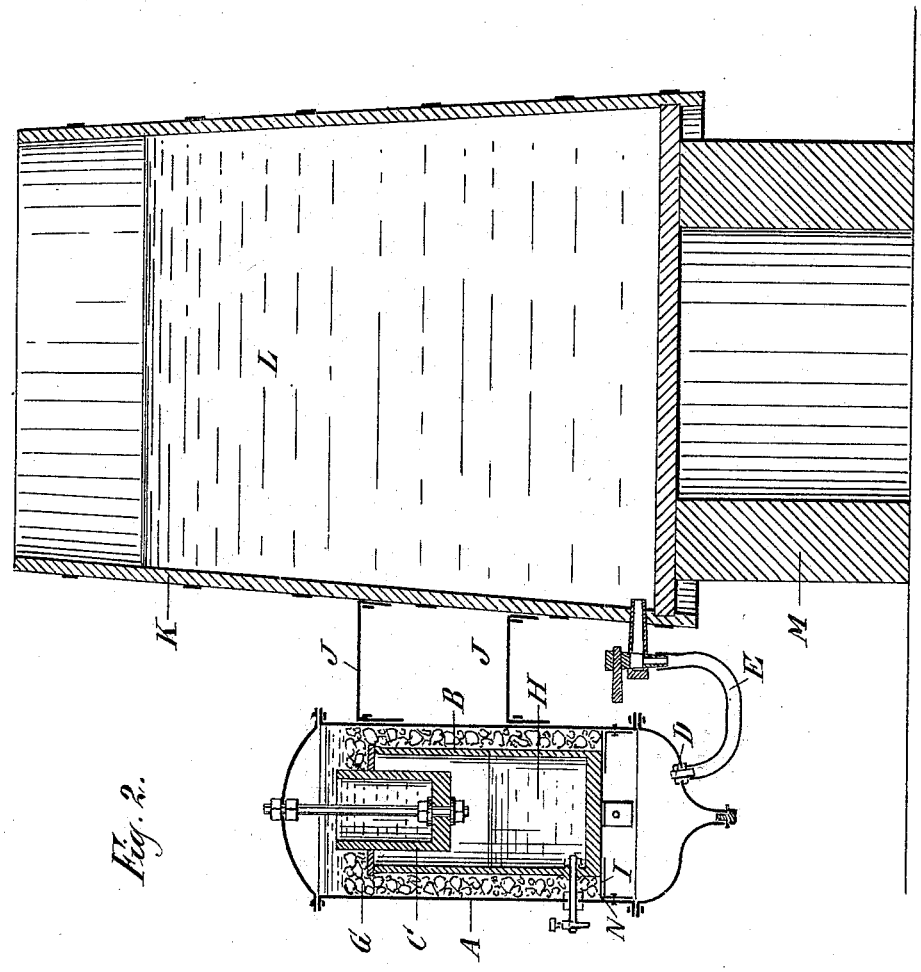

Figure 1 is a sectional view showing filter attached to pipe by hangers and faucet open. Fig. 2 is a sectional view showing filter attached to cistern. Fig. 3 is a detail view showing the perforated disk and strainer of ramie fiber.

Similar letters refer to similar parts throughout the several views.

In the drawings A refers to an outer shell of filter, which is preferably constructed of aluminum.

B is an inner shell which may be of any desired material, such as terra-cotta, glazed porcelain, or any substance free from mineral.

C is a porous stone held in position by suitable means, and through which water, fluids, oils or saccharine solutions percolate after passing through filtering material placed between A and B.

In Fig. 1, D shows a pipe connected to a faucet leading from a hydrant by a pipe-joint E. F shows a water pipe. G is a filtering material; H, filtered water. I is a perforated disk supported by brackets I', and N is a strainer of ramie fiber laid on said disk, which material has more strength than cotton, hair or ordinary felt. The peculiarity of the ramie fiber makes it preferable when woven to other filtering cloths, as it is less liable to yield under pressure, and does not stretch or bag, thus giving better results. J are hangers for attaching filter to cistern or stand-pipe. K designates a cistern. L shows water in cistern; M, a base for cistern.

I do not limit myself to any particular size of filter, as they may be of any desired size, any of which produces a rapid filtration, as the water enters the filter through E and D, percolates through the filtering material, and thence through the porous stone, into a receptacle where it is drawn off through a faucet.

This invention is an improvement upon my water and fluid filter filed April 30, 1892, Serial No. 431,382.

A striking advantage of my invention is its economical construction and the rapidity with which water may be filtered, as well as wines, liquors, saccharine solutions, oils, cider and other fluids.

Having described my invention and the manner in which the same is or may be carried into operation, I would say in conclusion that I do not limit myself to the precise details shown in illustration, as the same may be varied to some extent; but

What I claim, and desire to secure by Letters Patent, is—

In a fluid filter, the combination of the outer shell A and the mud-drum attached thereto with the inlet pipe D extending down into the lower part of the space within the said outer shell, brackets attached to the interior of the said shell, an inner shell B supported on the said brackets, a porous receptacle C which is set into the top of the said inner shell, means for suspending the said receptacle from the crown of the said outer shell, filtering material interposed between the two shells, and a perforated disk and strainer of ramie fiber supported by the said brackets and forming a base for the said filtering material, substantially as set forth.

In testimony whereof I affix my signature in presence of two witnesses.

SAMUEL B. ALLISON.

Witnesses:
RICARDO DEE,
L. MCCARTHY.